(12) United States Patent
Farrally-Plourde

(10) Patent No.: US 6,736,414 B2
(45) Date of Patent: May 18, 2004

(54) SNOW SKIING DEVICE

(76) Inventor: Yana Farrally-Plourde, P.O. Box 784, Portland, ME (US) 04104

( * ) Notice: Subject to any disclaimer, the term of this patent is extended or adjusted under 35 U.S.C. 154(b) by 0 days.

(21) Appl. No.: 10/225,639

(22) Filed: Aug. 22, 2002

(65) Prior Publication Data

US 2003/0038434 A1 Feb. 27, 2003

Related U.S. Application Data

(60) Provisional application No. 60/314,441, filed on Aug. 23, 2001.

(51) Int. Cl.⁷ .......................... B62B 13/08; B62K 15/00
(52) U.S. Cl. ........................ 280/16; 280/20; 280/21.1; 280/14.25; 280/14.28; 280/287
(58) Field of Search .................... 280/12.13, 12.14, 280/845, 14.25, 14.27, 16, 20, 21.1, 14.28, 287, 278, 87.041, 87.05; 180/180, 182, 183, 193

(56) References Cited

U.S. PATENT DOCUMENTS

| | | | |
|---|---|---|---|
| 1,968,975 A | | 8/1934 | Upsacker et al. ............. 280/16 |
| 3,204,263 A | | 9/1965 | Bash ............................. 9/310 |
| 3,438,643 A | * | 4/1969 | Spiehs ......................... 280/16 |
| 3,561,783 A | * | 2/1971 | Ellet ............................ 280/16 |
| 3,588,138 A | * | 6/1971 | Ceray, Jr. .................... 280/16 |
| 3,638,960 A | * | 2/1972 | Eaton .......................... 280/16 |
| 3,656,775 A | * | 4/1972 | Krautter ...................... 280/16 |
| 3,658,357 A | * | 4/1972 | Porsche et al. .............. 280/16 |
| 3,717,359 A | * | 2/1973 | Peronnon et al. ............ 280/16 |
| 3,730,546 A | * | 5/1973 | Evequoz ...................... 280/16 |
| 3,858,896 A | | 1/1975 | Evequoz ...................... 280/16 |
| 3,862,766 A | | 1/1975 | Bogdanowich .............. 280/16 |
| 3,870,329 A | * | 3/1975 | Evequoz ...................... 280/16 |
| 3,870,330 A | * | 3/1975 | Hatano et al. ................ 280/16 |
| 3,894,746 A | * | 7/1975 | Evequoz ...................... 280/16 |
| 4,014,283 A | * | 3/1977 | Crnogorac ............... 114/55.55 |
| 4,027,891 A | * | 6/1977 | Frame ....................... 280/7.14 |
| 4,063,746 A | * | 12/1977 | Hansen ........................ 280/16 |
| 4,097,055 A | * | 6/1978 | Laycraft ...................... 280/16 |
| 4,138,128 A | * | 2/1979 | Criss ............................ 280/16 |
| 4,161,324 A | * | 7/1979 | Colvin .................... 280/14.25 |
| 4,221,394 A | * | 9/1980 | Campbell ................ 280/14.25 |
| 5,249,816 A | * | 10/1993 | Southworth ............. 280/14.25 |
| 5,613,695 A | * | 3/1997 | Yu .......................... 280/14.25 |
| 5,863,051 A | * | 1/1999 | Brenter ........................ 280/16 |
| 6,626,441 B1 | * | 9/2003 | Hanson .................... 280/7.14 |
| 2001/0038184 A1 | * | 11/2001 | Stafford .................. 280/14.27 |

FOREIGN PATENT DOCUMENTS

| | | | |
|---|---|---|---|
| CA | 1003464 | | 1/1977 |
| CH | 164 066 | | 11/1933 |
| DE | 910 620 | | 5/1954 |
| FR | 2 817 226 A1 | * | 11/2000 |
| GB | 2 341 363 A | * | 9/1999 |
| WO | WO 98/56640 | * | 12/1998 |

* cited by examiner

*Primary Examiner*—Brian L. Johnson
*Assistant Examiner*—Jeffrey J. Restifo
(74) *Attorney, Agent, or Firm*—Kevin A. Oliver; Foley Hoag LLP

(57) ABSTRACT

A snow skiing device on which a skier may sit and/or stand. The device includes a frame having a front end and a rear end. A ski system which, in one embodiment, includes a steerable front ski attached to the front end and a rear ski attached to the rear end of the frame. The skis can be in linear alignment with one another. The device further includes a platform extending from the front end to the back end of the frame and is positioned above the skis. The platform, in one embodiment, is parallel to the skis.

27 Claims, 14 Drawing Sheets

SNOW SKIIING DEVICE

RELATED U.S. APPLICATION(S)

This application claims priority to U.S. Application Serial No. 60/314,441, filed Aug. 23, 2001, which application is hereby incorporated herein by reference.

FIELD OF THE INVENTION

The present invention relates to a snow skiing apparatus, and more particularly, to a snowbike or snowscooter, which permits a skier to stand or sit thereon while skiing.

BACKGROUND ART

In recent years, snowbikes, also known as skibikes and skibobs, as well as snowscooters, have begun gaining resort acceptance and rental-shop placement at several North American ski resorts. Variations of snowbikes and snowscooters have been marketed for over fifty years worldwide. Nevertheless, these products currently comprise a very small portion of the winter sports market. One reason that these products have remained in relative obscurity, especially in the US market, is that no current snowbike or snowscooter manufacturer has been able to develop and market a product with the potential to perform at a level equal to that exhibited by motocross, BMX (bicycle motocross), freeskiing and/or snowboarding. Moreover, existing snowbikes, with their thin width ski designs, require riders to wear little foot-skis and use them as outriggers for balance and control. The resulting products may be easily maneuverable on groomed terrain, but are limited when it comes to performing any freestyle tricks, jumps, or use on more varied terrain. Furthermore, the designs of these products make them difficult to be transported to the top of a ski slope for use. In particular, the seats provided on the snowbikes can make the snowbikes difficult to load and unload from, for instance, a chairlift, a gondola or a tram.

Currently, there are several companies marketing snowbikes, snowscooters, or snow cycles. An example of such a device includes the Brentner Original Snowbike (see FIG. 1A). The design of this snowbike requires the use of footskis (i.e., small skis) worn by the rider for steering and stability. Such a design is primarily responsible for the "training wheels" look and performance of the product, can limit the performance potential, especially for tricks.

Another snow skiing device is the K2 Snowcycle (see FIG. 1B). The K2 Snowcycle is lightweight, and uses shaped ski technology and mountain bike style suspension. Nevertheless, it is still based on a traditional design using mini footskis for additional support and steering.

In addition to the above, there is currently available the Insane Toys Snowscoot (see FIG. 1C). The Insane Toys Snowscoot is based on a BMX frame without a seat, and is mounted onto two snowboard-style runners. This product is heavy and can be too sluggish and cumbersome.

Other commercially available products include the Koski Snowsports Monotrac (see FIG. 1D), which incorporates the use of footskis, and uses shaped ski technology; the Vertex Skibob (see FIG. 1E), which has a similar design to the Brentner Snowbike; Arete Outdoors Rush scooter, which can be ridden like a downhill mountain bike in the summer and then fitted with snowboards in the winter; and Snowcrossbike, a Scandanavian company with a fairly low-tech and toy-like product wherein plastic skis are bolted on to a bike frame. Winter X Bike, another company which offers a conversion system, has a design to convert a street bike into a snowbike for the winter. While the conversion appears relatively simple, the design can be problematic. In particular, the dimensions and geometry of a street bike are not well suited to riding on snow. Beyond these companies, the market includes other smaller, garage-shop operations.

The Burton Snowdeck (see FIG. 1F) provides a snow-skateboard design wherein a skateboard-type platform is employed over a ski. This design requires the rider to stand sideways on the platform to get sufficient leverage, like a skateboard, and provides no handle or seat for use by the rider. This device, without a handle, seat or bindings, may make it difficult to load on and off a chairlift or a surface lift, such as a T-bar. Moreover, at present, snowdecks are not allowed on lifts at most ski resorts.

Accordingly, it would be desirable to provide a product which is easy to ride, maneuverable and stable over a wide variety of terrains, suitable for performing tricks and stunts, and easy to transport up and down ski slopes.

SUMMARY OF THE INVENTION

The present invention provides a snow skiing device that is designed for high performance and to be handled with relative ease. The device can be sufficiently compact for bringing onto and getting off of ski lifts, and takes up no more room than a skier or snowboarder. The device requires no special adjustments to the lift equipment or procedures, and can be used on surface lifts like T-bars. In addition, a collapsible design allows the device to be easily carried onto a crowded gondola or tram for transport.

In one embodiment, a skiing device is provided having a frame with a front end and a rear end. The device also includes a first ski positioned at the front end of the frame. The first ski, in one embodiment, can be attached to a steering mechanism positioned at the front end of the frame, and is capable of being directed for maneuvering the device. The device further includes a second ski positioned at the rear end of the ski, such that the second ski is in substantial linear alignment with the first ski. A platform may be provided above the first and second skis, so that it extends from the front end to the rear end of the frame. The platform, in an embodiment, includes a width sufficiently wider relative to that of the first and second skis to permit a user to stand thereon. The device may also include a suspension system between the first ski and the steering mechanism, an another suspension system between the second ski and the platform. The frame may be made to be collapsible to provide a compact configuration for transport.

In another embodiment, the present invention provides a vehicle having a frame with a front end and a rear end. The vehicle may also include a handle coupled to the front end of the frame onto which a user may hold. The vehicle may further include a ski system attached to the frame and extending from the front end to the rear end of the frame. The ski system may include one continuous ski from the front end to the rear end of the frame, or two skis, with one at the front end of the frame and the other one at the rear end of the frame. A platform is provided above the first and second skis, so that it extends from the front end to the rear end of the frame. The platform, in an embodiment, includes a width sufficiently wider relative to that of the first and second skis to permit a user to stand thereon. The device may also include a suspension system between the first ski and the steering mechanism, an another suspension system between the second ski and the platform. The frame may be made to be collapsible to provide a compact configuration for transport.

DESCRIPTION OF SPECIFIC EMBODIMENTS

The present snow skiing device, in accordance with one embodiment, has been developed to rival, for instance, high performance skis and snowboards. The device leverages design and technology from ski, snowboard, bike, skateboard, motorcycle, and snowmobile. The device is very intuitive to ride. Riders who are skilled at BMX, snowboarding, and similar sports can master the basics in a matter of runs, and be landing jumps by the end of the first day.

Figure 1A:
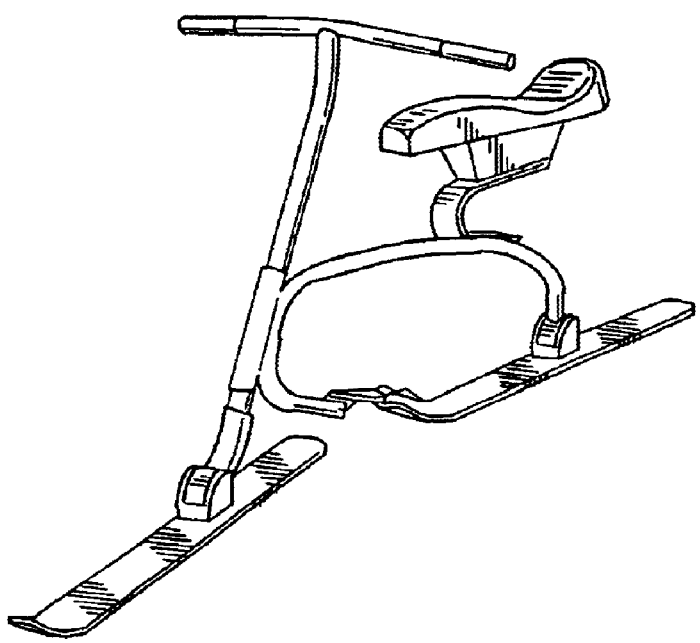
FIGS. 1A–F illustrate various prior art snow skiing vehicles.
Figure 1B:
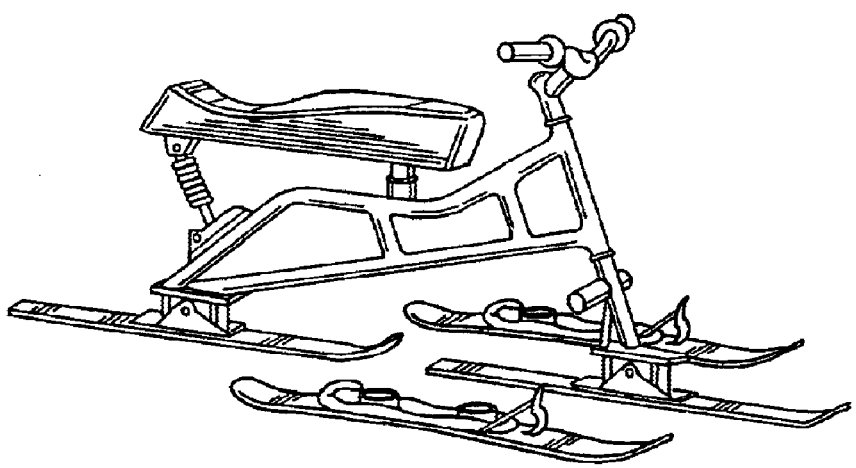
Figure 1C:
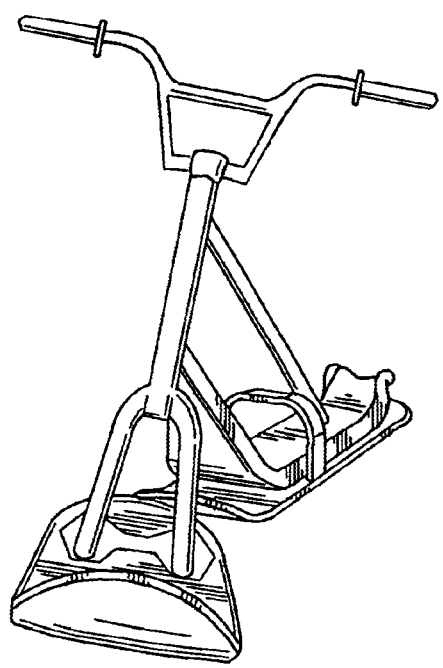
Figure 1D:
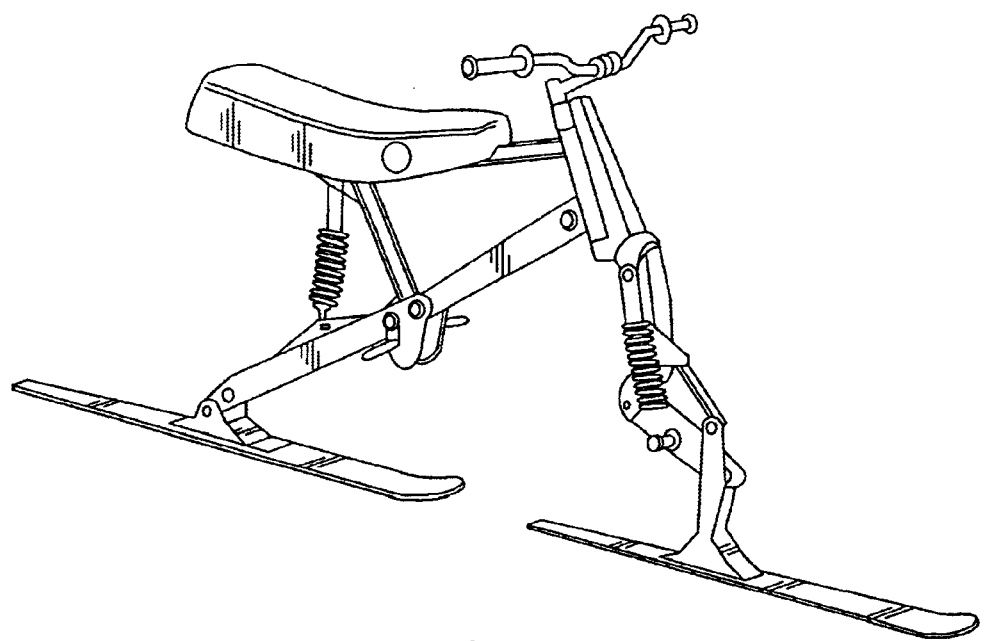
Figure 1E:
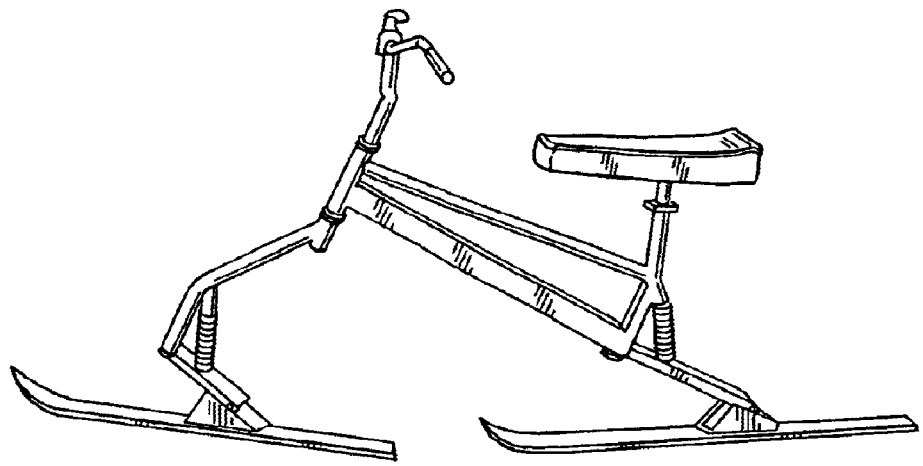
Figure 1F:
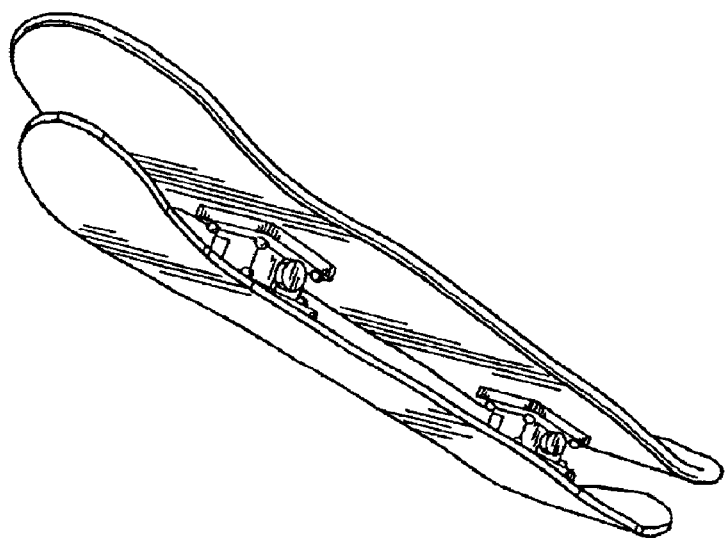
Figure 2:
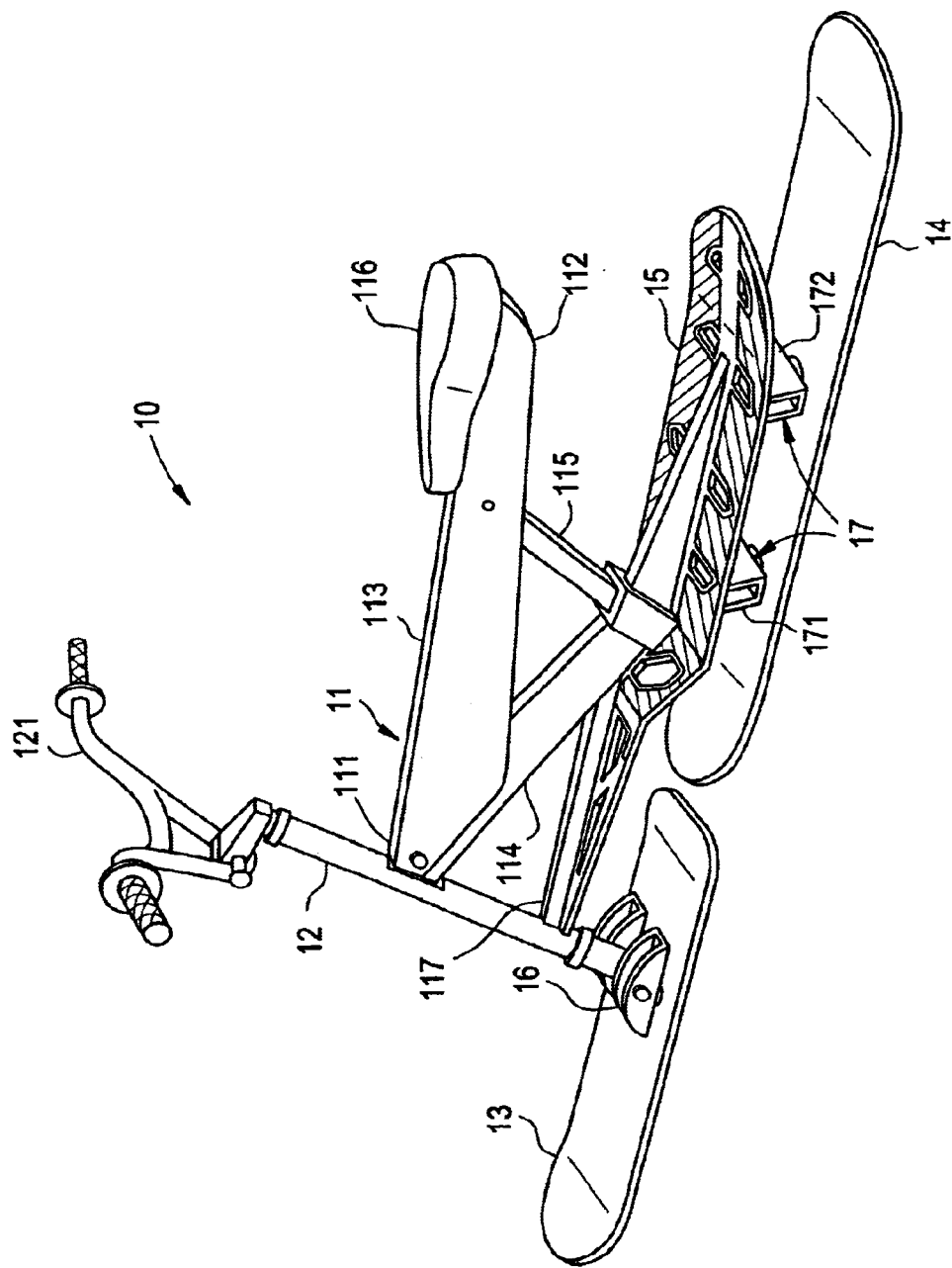
FIG. 2 illustrates a perspective view of a snow skiing device in accordance with one embodiment of the present invention.

In FIG. 2, there is shown a snow skiing device 10, in accordance with one embodiment of the present invention. The skiing device 10 can be provided with a frame 11 having a front end 111 and a rear end 112. The skiing device 10 may be equipped with a steering mechanism 12 positioned at the front end 111 of the frame 112. As illustrated in FIG. 2, the steering mechanism 12 may include a handle bar 121 on to which a user may hold when riding the device 10. The handle bar 121 can be a conventional bicycle handle bar or any similar designs, so long as it permits a rider to hold or grip firmly and securely thereto.

Still looking at FIG. 2, the frame 11 includes a top member 113, a lower member 114 coupled to the top member 113 about the front end 111 of the frame 11, and a transverse member 115 positioned towards the rear end 112 of the frame 11. The transverse member 115 can be designed to extend between the top member 113 and the lower member 114. A seat 116 may be provided on the top member 113 towards the rear end 112 of the frame 11 to allow the user to sit thereon. If desired, the seat 116 may be designed to be adjustable along the length of the top member 113 to accommodate various user physical attributes.

Figure 3:
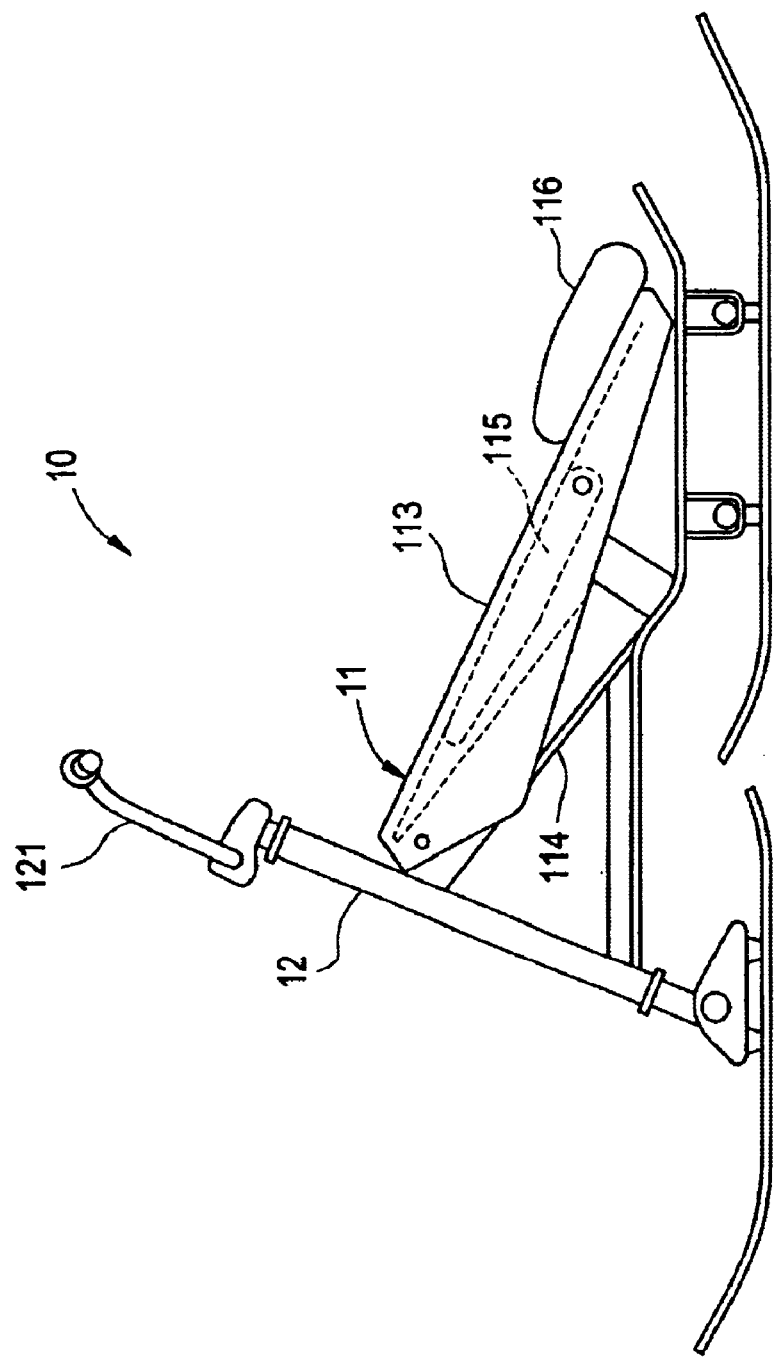
FIG. 3 illustrates the device shown in FIG. 2 in a collapsed state.

In one embodiment of the invention, frame 11 can be designed to be collapsible, so as to permit the frame 11 to take on a compact configuration, as shown in FIG. 3, for easy transport. To that end, the top member 113 may be pivotally connected to the lower member 114 about the front end 111 of the frame 11. In addition, the transverse member 115 may be pivotally attached to the top member 11, while being movably coupled to the lower member 114. The collapsible design provides a simple solution to, for instance, the chairlift problem going up the ski slope, while also allowing the device 10 to be made more compact for travel.

Figure 4:
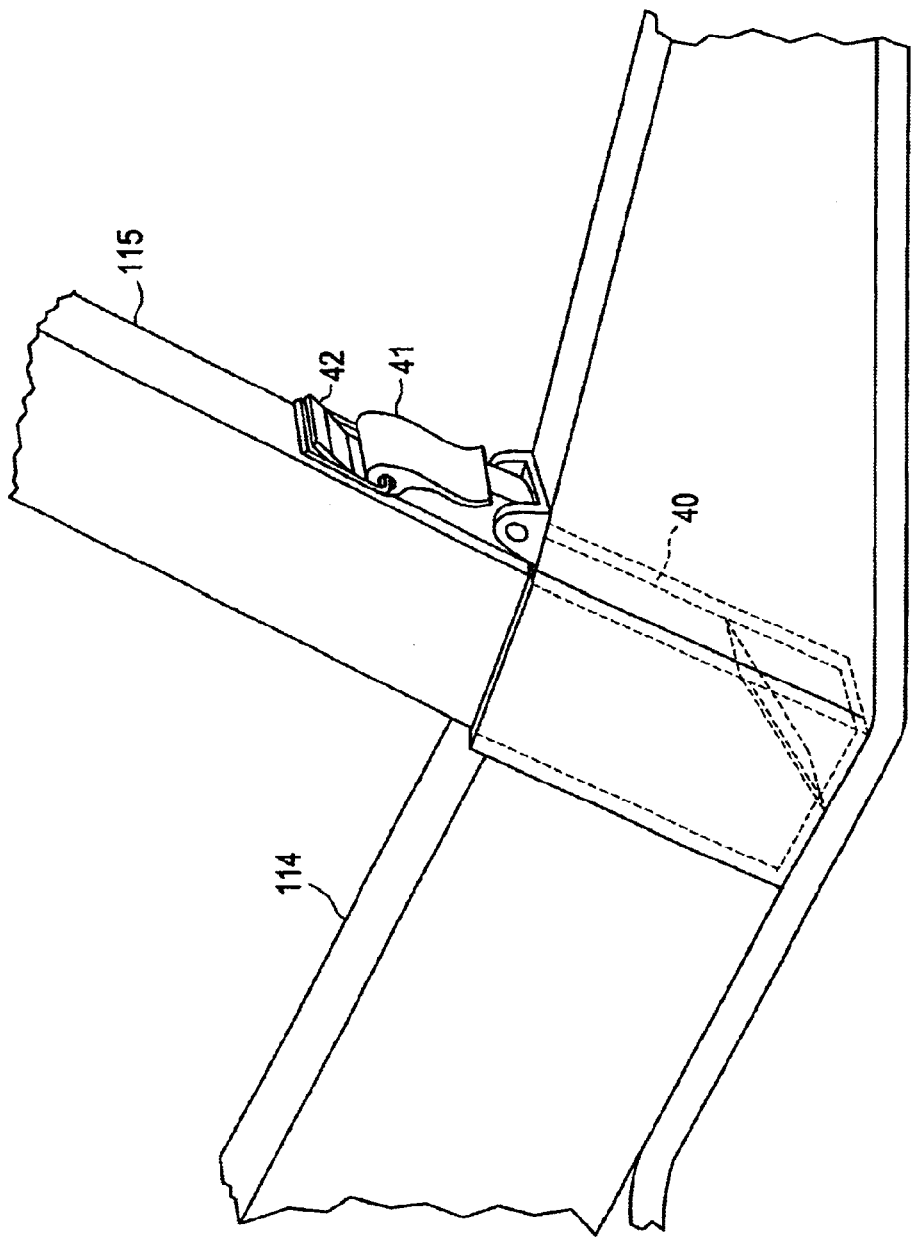
FIG. 4 illustrates a locking mechanism for the transverse member of the device shown in FIGS. 1–2.

As shown in more detail in FIG. 4, the lower member 114 may be provided with a cavity 40 within which one end of the transverse member 115 may be received. The cavity 40, in an embodiment, may be provided with a configuration which compliments the peripheral geometry of the transverse member 115. It should be noted that the cavity 40 can be provided with any geometric configuration, so long as it is capable of securely receiving the one end of the transverse member 115. To maintain a secured engagement of the transverse member 115 within the cavity 40, in one embodiment, a clamp 41 may be provided adjacent the cavity 40 for latching onto, for instance, a hook 42 provided on the transverse member 115.

Figure 5:
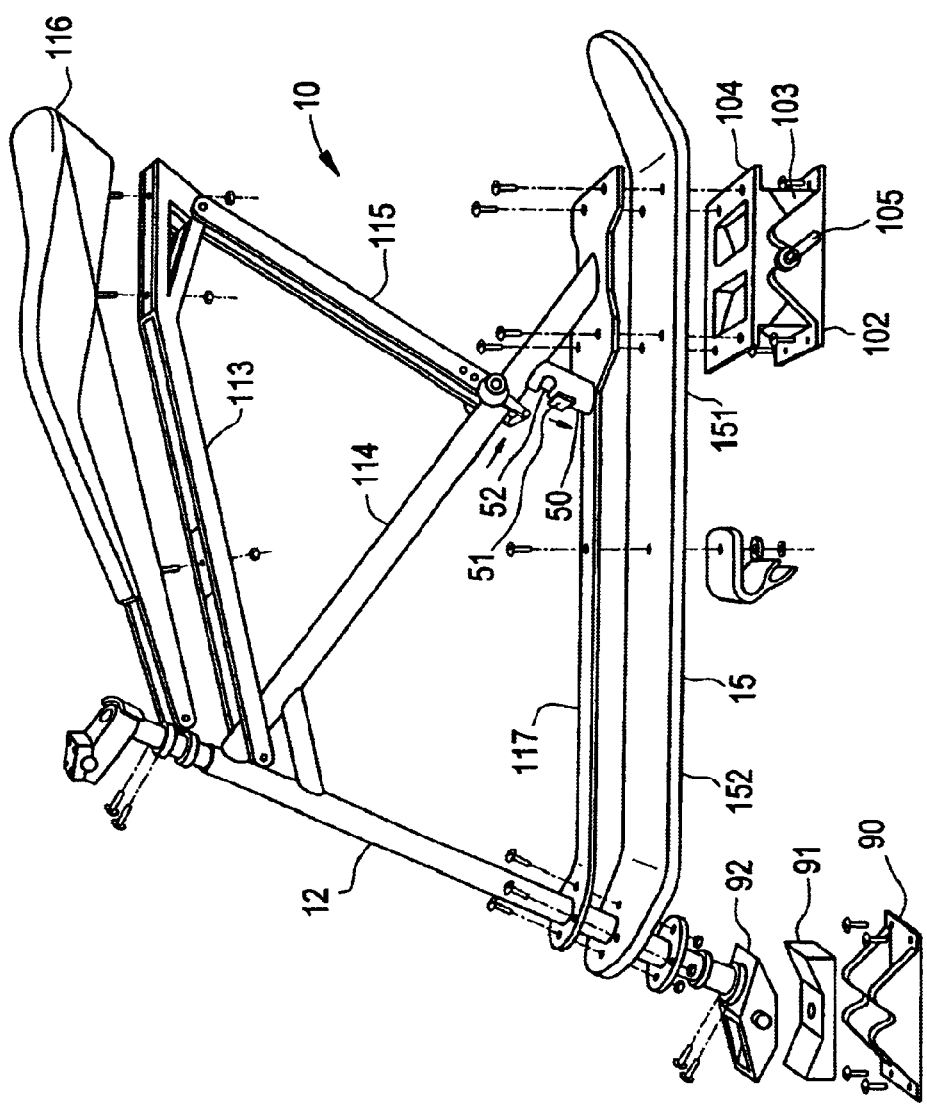
FIG. 5 illustrates a snow skiing device in accordance with another embodiment of the present invention.

Alternatively, the transverse member 115, looking now at FIG. 5, may be designed so that its one end, opposite the end pivotally attached to the top member 113, can be received within a latch 50 and secured therein. FIG. 5 illustrates a device 10 in accordance with another embodiment of the present invention. Latch 50, as illustrated, can be similar to a key chain hook latch, whereby pushing button 51 downward in the direction of the arrow shown causes vertical bar 52 to move downward therewith to expose a cavity within which the one end of the transverse member 115 may be received. Releasing the button 51 permits the vertical bar 52 to move upward and secure the one end of the transverse member 115 within the cavity. Of course other securing mechanisms known in the art may be used to maintain the secure engagement of the transverse member 115 with the lower member 114. If desired, to accommodate the heights of different users, the connection between the transverse member 115 and the lower member 114 may be varied to adjust the height to the top member 113 and thus the height of the seat 116.

The frame 11, along with the top member 111 and the seat 116 of the present device 10 can provide a solid leverage point between the knees and lower legs of the rider when riding aggressively. Like a BMX, Mountain Bike, or Motocross bike, the rider may not actually spend a lot of time in the seat 116 when riding aggressively. As such, the top member 111 and seat 116 can act to aid in controlling the device 10 on steep terrain and in aggressive maneuvers. In particular, the top member 111 and seat 116 allow the rider to take advantage of all of the positions available, such as on a BMX or Motocross bike, for example, throwing a foot out to help in a tight, banked turn, or grabbing the seat during tricks, or providing additional control during big landings.

As it needs to withstand a large amount of force, as well as act as a support structure, the frame 11 can be made from a strong material. As it also must also allow the device 10 to be maneuverable for high performance, the material from which the frame 11 can be made should also be lightweight. Accordingly, the frame 11 can be made from materials such as steel, aluminum, graphite, or other composite materials.

Referring again now to FIG. 2, device 10 further includes a first ski 13 positioned at the front end 111 of the frame 11 and a second ski 14 positioned at the rear end 112 of the frame. The front ski 13 is designed to be maneuverable to control the direction of the device 10, as the device 10 proceeds down a ski slope. To that end, the first ski 13 may be coupled to the steering mechanism 12 at an end opposite that of the handle 121. The first and second skis 13 and 14, in one embodiment, may be in substantial linear alignment, so that they together can act as one continuous ski, to enhance the performance to the device 10.

Figure 6:
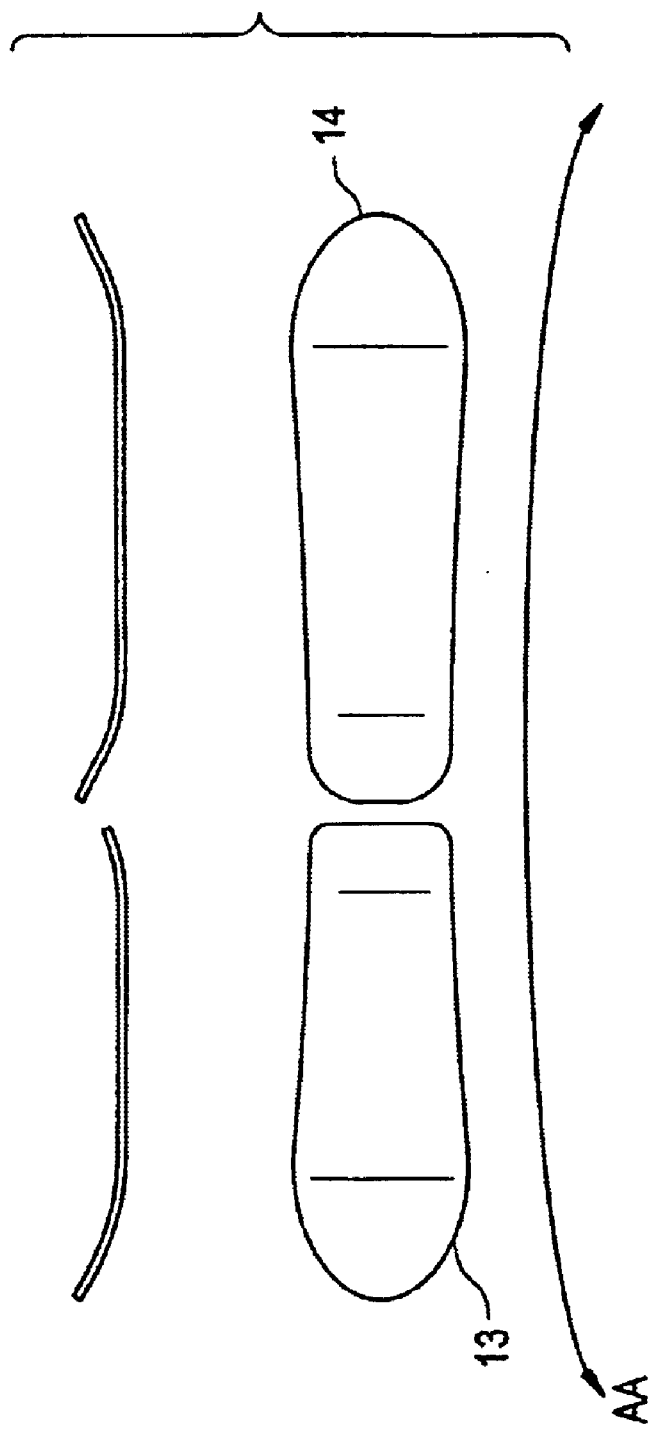
FIG. 6 illustrates a top view of a ski system for use with a skiing device in accordance with one embodiment of the present invention.

To further enhance performance of the device 10, with reference now to FIG. 6, the first and second skis 13 and 14 may be provided with a substantially continuous sidecut radius AA. In other words, the skis may be designed so that there is a substantially continuous arc from the first ski 13 across a gap between the first and second skis, and continuing through to the second ski 14. With such a design, the first and second skis 13 and 14 can turn (e.g., carved turns) and perform as one ski, while allowing for quicker turning and adjustment from the handle-controlled first ski 12. To enhance stability of the device 10, the first and second skis 13 and 14 may be provided with a width that is sufficiently wide, approaching that of a typical snowboard. Such a width can also enhance the speed of the device 10 in various snow conditions, as the skis 13 and 14 may be permitted to float, for instance, in powder snow, without giving up precise turning on icy snow and/or packed snow. It should be noted that the skis 13 and 14 can take on various configurations and dimensions, for instance, with slightly curved ends, so long as the configuration and dimensions permit the skis, and thus the device 10, to perform at a high level in the snow.

Figure 7A:
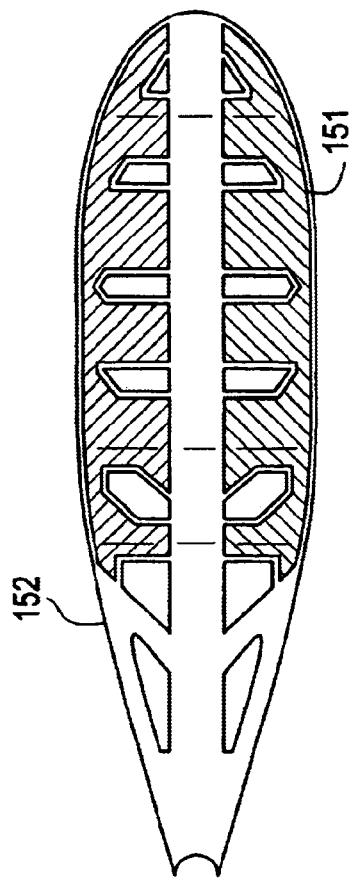
FIGS. 7A–B illustrate a platform for use with a skiing device in accordance with one embodiment of the present invention.
Figure 7B:
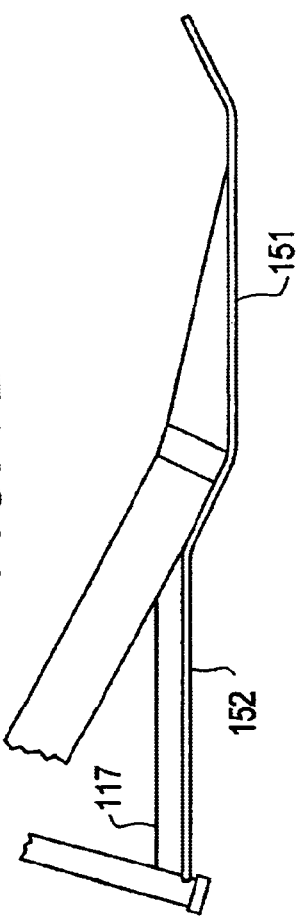

The device 10, unlike existing skiing devices, do not require the rider to wear footskis or stand on the skis of the device when riding. The device 10, instead, may be provided with a platform 15 extending from the front end 111 to the rear end 112 of frame 11, so as to provide a surface on which a rider may stand. In one embodiment, the platform 15, as shown in FIG. 2, may be positioned above the first 13 and second 14 skis, such that the platform 15 is substantially parallel to the skis. The platform 15, looking now at FIGS. 7A–B, may be attached to the frame 11 by having its rear portion 151 secured along the length of the lower member 114. In one embodiment, the platform 15 may also be secured at its front portion 152 to a bracing member 117, which member 117 extends from the lower member 114 to the steering mechanism 12. In the embodiment shown in FIGS. 7A–B, the platform 15 may include an elevated front portion 152 relative to its rear portion 151, so as to permit the platform 15 to conform to the relative positions of the lower member 114 and bracing member 117. The elevation of the front portion 152 can also provide ample clearance for the tips and/or flexing of the first and second skis 13 and 14 during operation.

Although illustrated as being elevated, it should be appreciated that the platform 15 may be designed so that the front portion 152 and the rear portion 151 can be at a substantially similar height, such as that shown in FIG. 5. In the embodiment shown in FIG. 5, the platform 15 may be attached to the bracing member 117 substantially along the length of the bracing member 117. The bracing member 117, in FIG. 5, also extends from the lower member 114 to the steering mechanism 12.

As the platform 15 is positioned above the skis, the platform 15 can act to solidly bridge both the first 13 and second 14 skis, and to permit the skis, in an embodiment, to act as one unit. Moreover, such a design and location of the platform 15 can enhance the structural integrity of the skiing device 10, while permitting the rider to stand on the rear portion 151 at a comfortable height above the snow when riding. The positioning of the platform 15 above the skis also allows the platform 15 to have a width that is relatively wider than that of skis 13 and 14 without causing interference to the skis when turning. Furthermore, the positioning of the platform 15 provides the rider with tremendous leverage over the skis 13 and 14, allowing the rider to make subtle adjustments with small shifts in the positioning of his body, or to make dramatic adjustments with larger shifts of his body. It should be noted that the width of the platform 15 may alternatively be made to be similar in size to the end portions of the skis 13 and 14. In such an embodiment, the platform 15 may still be slightly larger in width than the middle portion (i.e., sidecut area) of the skis 13 and 14.

Without the impediment of footskis, or the Bootstraps as required with other skiing devices, the presence of platform 15 allows a rider to wear comfortable snowboard-style boots, and skate easily (e.g., push with one foot like a skateboard) to get across flat sections. It also allows for BMX and Motocross tricks that require taking the feet off the device 10. In short, the platform 15, with its design, allows for a wide range of standing positions, so that the rider may shift his weight forward and back in different snow conditions, keep feet parallel or spread apart, prepare and land jumps, sit and cruise, or stand and ride aggressively.

Referring again to FIG. 2, the device 10 may be provided with a front suspension system 16 between the first ski 13 and the steering mechanism 12, and a rear suspension system 17 between the second ski 14 and the platform 15. In one embodiment of the invention, rear suspension system 17 may be provided with two suspension units 171 and 172. The suspension systems 16 and 17, in general, provide shock absorption and dampening to the first ski 13 and the second ski 14 respectively. It should be noted that skis are generally long, flexible, and can act as a suspension system inherently. Thus, the application of simple "up and down" suspension systems, such as that seen in motorcycles or bicycles, to a ski can create a bucking bronco effect. Accordingly, the suspension systems 16 and 17 are designed to enhance the natural tendencies of the skis to flex from front to back, while providing shock absorption and dampening from uneven terrain. The sensation for the rider on skiing device 10 having the suspension systems 16 and 17, therefore, would be similar to the feeling of riding on BMX tires, that is, a reduction in shock, but with a solid, stable and predictable feel. This can be accomplished by using, for instance, a urethane material or any material with high-rebound characteristics. The high-rebound characteristics of the urethane suspension systems can quickly center the respective skis to keep the skis flat and stable, allow the skis to load up and flex naturally tip to tail, and can enhance transitions of the skis from edge to edge. It should be appreciated that the degree of flex can be adjusted with different durometer (hardness) bushings in the suspension systems. Furthermore, the high-rebound characteristics of the urethane suspension systems can also help the second ski 14 to slide and stop, jump, or turn more sharply.

Figure 8:
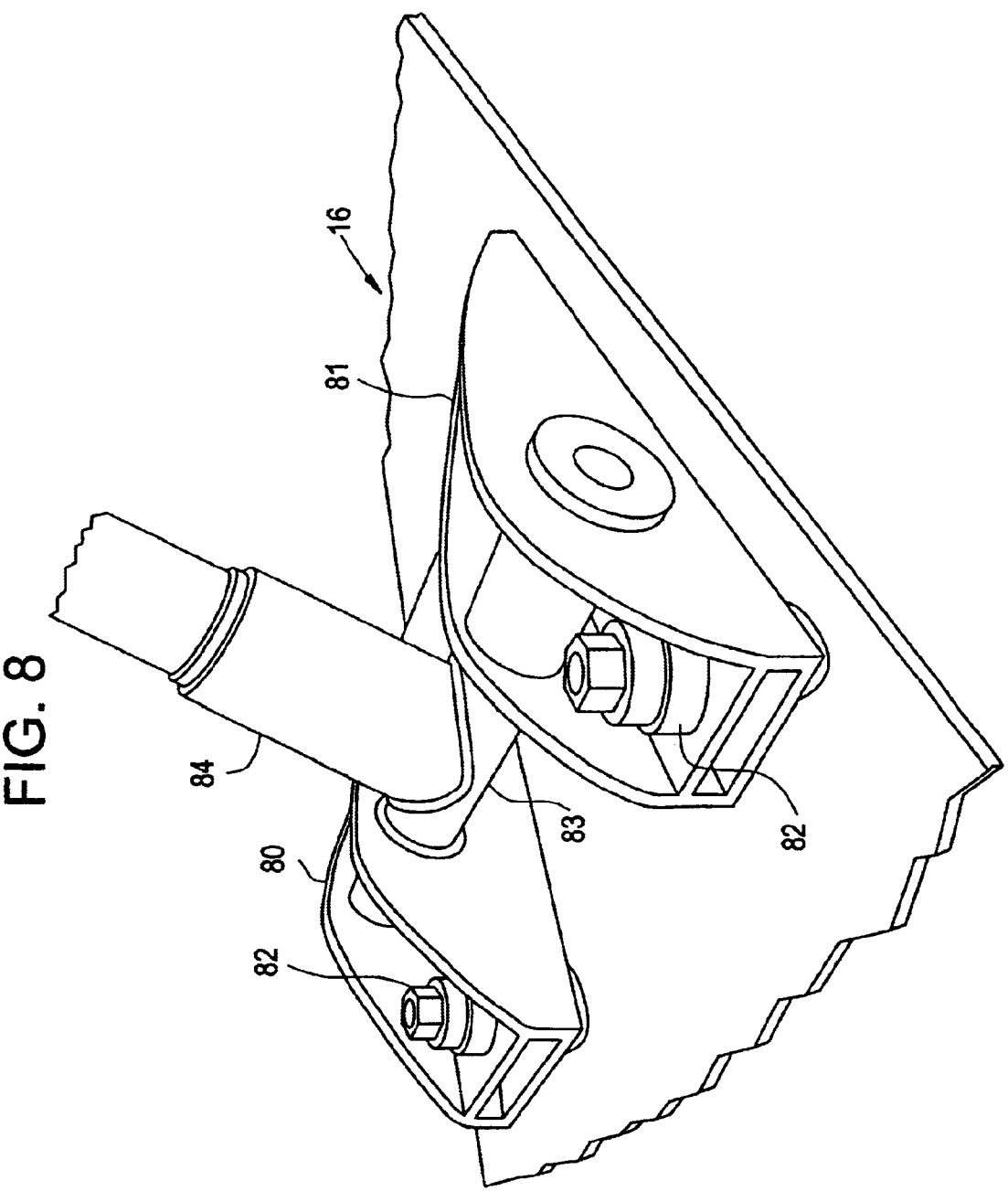
FIG. 8 illustrates a front suspension system for use with a skiing device of the present invention.

As shown in FIG. 8, the front suspension system 16 includes substantially parallel legs 80 and 81. Legs 80 and 81 may be removably secured to the first ski 13 by use of a bushing and bolt suspension 82. It should be noted that other similar devices known in the art may be used to removably secured the legs 80 and 81 to the first ski 13. The suspension system 16 further includes an arm 83 extending across legs 80 and 81. In one embodiment, the arm 83 may be pivotally connected between the legs 80 and 81, and includes a neck 84 within which an end of the steering mechanism 12 opposite the handle bar 121 may be removably received. In one embodiment, the steering mechanism 12 may be secured within the neck 84 by a press fit.

Figure 9:
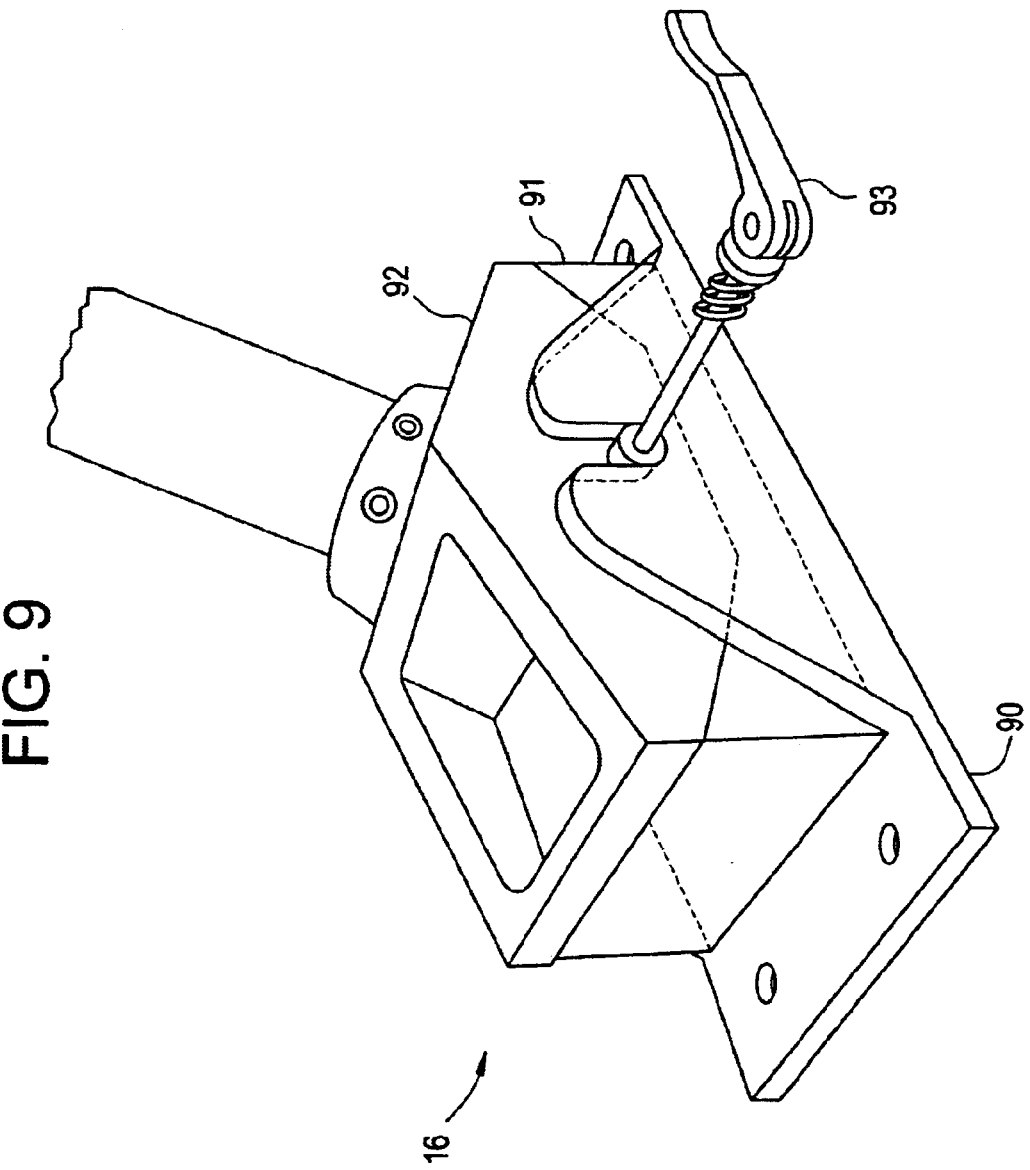
FIG. 9 illustrates an alternate front suspension system for use with a skiing device of the present invention.

An alternate embodiment for the front suspension system 16 is illustrated in FIGS. 5 and 9. In this embodiment, the suspension system 16 includes a base 90 on which a bushing 91 can be securely positioned. The base 90 may be designed to be removably secured to the first ski 13, while the bushing 91 can be designed to be removably secured to the base 90. The suspension system 16 also includes neck 92, removably positioned on the bushing 91, to receive one end of the steering mechanism 12. A quick release mechanism 93 can be provided to removably secure the neck 92 to the bushing 91 and the base 90.

Figure 10:
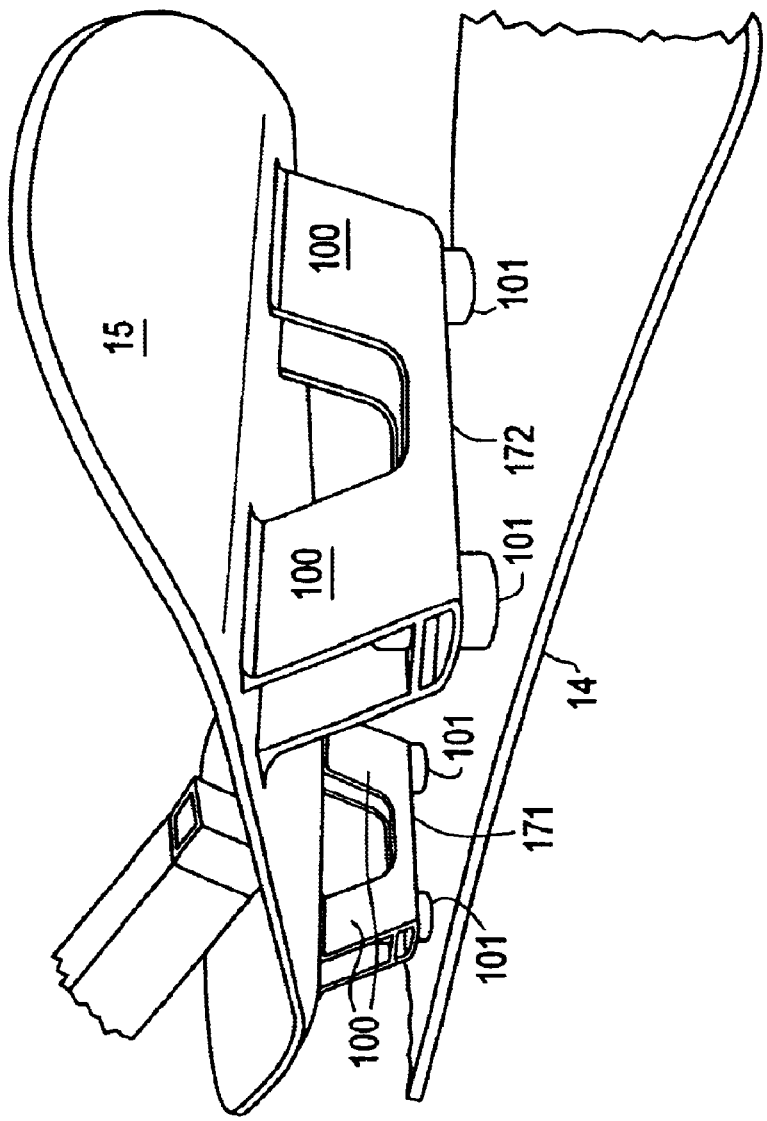
FIG. 10 illustrates a rear suspension system for use with a skiing device of the present invention.
Figure 11:
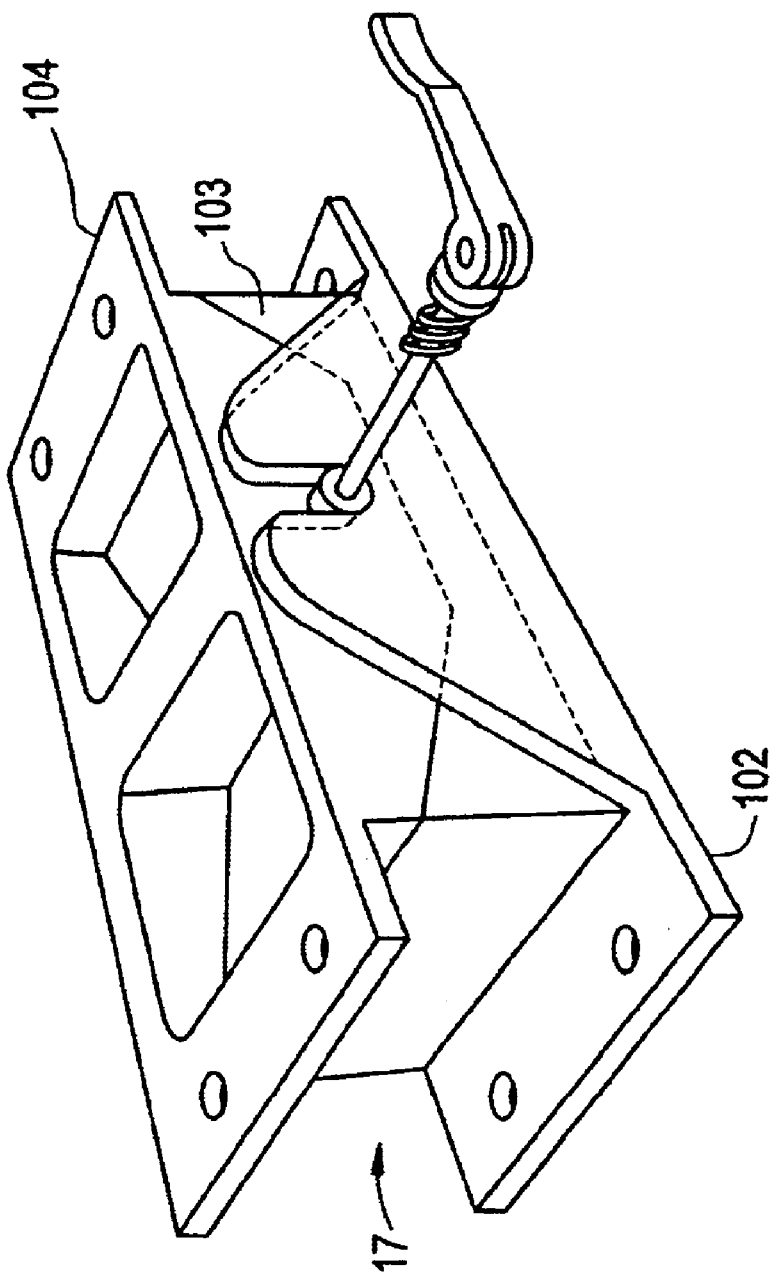
FIG. 11 illustrates an alternate rear suspension system for use with a skiing device of the present invention.

Looking now at FIG. 10, the rear suspension system 17 can include two substantially similar suspension units 171 and 172. Each unit can be provided with a plurality of legs 100 for engaging the bottom of the platform 15. Each unit can further include a plurality of feet 101 connected to legs 100 for engaging the second ski 14. Alternatively, as shown in FIGS. 5 and 11, the rear suspension system 17 can include a base 102 removably secured to the second ski 14 and a bushing 103 removably attached to the base 102, similar to that in the front suspension system 16. The suspension system 17 in FIGS. 5 and 11 can also include foot 104 removably positioned on the bushing 103 for engaging the bottom of the platform 15. A quick release mechanism 105 can also be provided to removably secure to the bushing 103 and the base 102.

By providing a suspension systems 16 and 17 from which the skis 13 and 14, and the steering mechanism 12 may be easily removed, maintenance of the ski 13, suspension system 16, and steering mechanism 12 can be readily carried out. Moreover, transport and storage of the device 10 can be made easier with such capability.

The device 10 may also be provided with a coiling leash (not shown), which can act as a retention mechanism to prevent runaways. Its design, in one embodiment does not interfere with the rider's use of the device or the performance of the device 10.

Figure 12A:
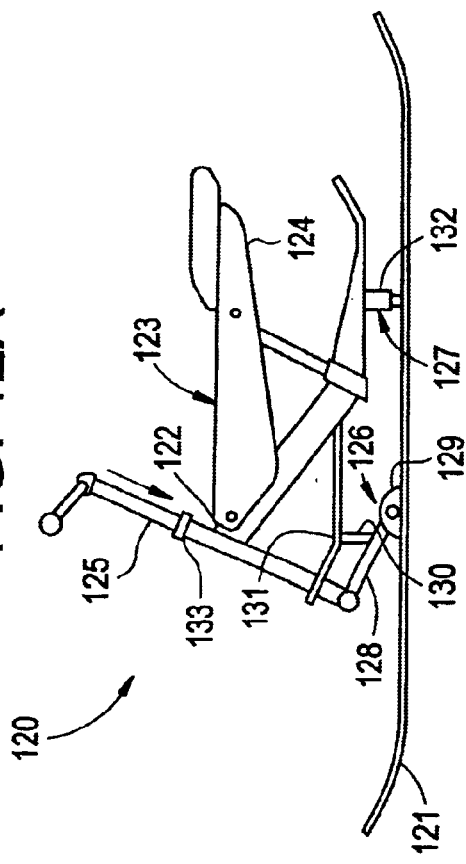
FIGS. 12A–B illustrate a skiing device in accordance with another embodiment of the present invention.
Figure 12B:
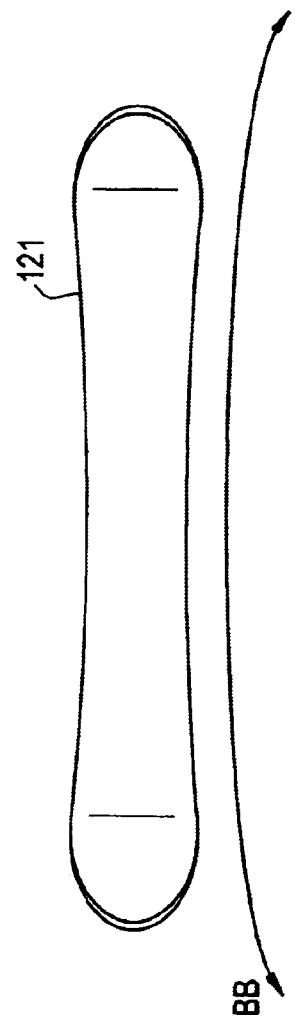

Referring now to FIGS. 12A–B, there is shown a skiing device 120 similar to the skiing device 10 shown in FIG. 1. However, instead of having a ski system with two skis as provided in connection with device 10, the device 120 includes a ski system with one continuous ski 121 extending from a front end 122 of frame 123 to a rear end 124 of frame 123. The ski 121 includes a substantially continuous sidecut radius BB from the front to the rear of ski 121, which can enhance the performance of the ski 121.

In addition, the device 120 may be provided with a fixed handle 125, with no steering capability, on to which a rider may hold for balance. The handle 125 may also be used for the initiation of turns by providing a mechanism onto which the rider may hold while leaning and applying pressure. The handle 125, in one embodiment, may be designed to slide up and down, for instance, in a telescopic manner using a quick-release mechanism 133. In this manner, the handle 125 would be easily adjustable to accommodate differences in height of riders, as well as making the device more compact and portable for transport, especially when the handle 125 is retracted completely. Alternatively, the handle 125 may be designed to slightly turn, but not being connected to the ski 121, as shown in FIG. 12. To that end, a rider would be afforded the turning sensation and body positioning with respect to the handle 125 to allow the rider to feel more natural on the device 120.

The device 120 may further include a front suspension system 126 and a rear suspension system 127. As shown in FIG. 12, the front suspension system 126 may include an arm 128 extending rearwardly from the handle 25 and connected to a suspension unit 129 similar to that provided in connection with device 10. The arm 128, in one embodiment, may be made to be pivotally connected to handle 125. The front suspension system 126 may further include a biasing mechanism 130 positioned between a front portion of platform 131 and the arm 128. With such a design, the front suspension system 126 can further absorb shocks as the device 121 travels over different terrains, yet still provide the necessary lateral force to get the ski 121 up on its edge. The rear suspension system 127 may include at least one suspension unit 132, and can be similar in design to that provided for the device 10. In an embodiment of the invention, the front and rear suspension systems 126 and 127 may be positioned at a distance of about 18 inches to about 22 inches from one another to permit the ski 121 to flex properly, while providing the rider with sufficient leverage to control the ski 121.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A skiing device comprising:
   a frame having a front end and a rear end, to frame including
   a top member,
   a steering mechanism positioned near the front end of the frame and attached to the top member, and
   a transverse member positioned near the rear end of the frame and attached to the top member and
   a lower member attached at a first end to the top member and the steering mechanism and at a second end to the transverse member:
   a first ski attached to the steering mechanism and capable of being directed for maneuvering the device;
   a second ski coupled to the transverse member, such that the second ski is in substantial linear alignment with the first ski; and
   a platform positioned between the top member and the first and second skis and extending from the front end to the rear end of the frame substantially parallel to the first and second skis, the platform including a platform front end and a platform rear end, the platform front end being attached to the steering mechanism and the platform rear end being attached to the transverse member and the second ski.

2. A skiing device as set forth in claim 1, further including a front suspension system between the first ski and the steering mechanism to provide shock absorption and dampening to the first ski.

3. A skiing device as set forth in claim 2, wherein the front suspension system is removably coupled to the first ski.

4. A skiing device as set forth in claim 1, wherein the frame includes a seat positioned at the rear end of the frame.

5. A skiing device as set forth in claim 1, wherein the frame is collapsible to permit the frame to take on a compact configuration relative to its non-collapsed configuration.

6. A skiing device as set forth in claim 1, wherein the top member is pivotally attached to the lower member about the front end of the frame.

7. A skiing device as set forth in claim 1, wherein the transverse member is pivotally attached to the top member.

8. A skiing device as set forth in claim 1, wherein the transverse member is movably coupled to the lower member.

9. A skiing device as set forth in claim 1, wherein the frame further includes a bracing member connected to the lower member, so as to permit the frame to securely engage the platform.

10. A skiing device as set forth in claim 1, wherein the first ski includes a width substantially similar to a width of the second ski.

11. A skiing device as set forth in claim 1, wherein the first and second skis include a width sufficiently wide to provide the skiing device with stability.

12. A skiing device as set forth in claim 1, wherein the platform includes a width sufficient permit a user to stand thereon.

13. A skiing device as set forth in claim 1, further including a rear suspension system positioned between the platform and the second ski to provide shock absorption and dampening to the second ski.

14. A skiing device as set forth in claim 13, wherein the rear suspension system includes at least one suspension unit.

15. A snow vehicle comprising:
- a frame having a front end and a rear end, the frame including
  - a top member,
  - a steering mechanism positioned at the front end of the frame and attached to the top member, and
  - a transverse member positioned near the rear end of the frame and attached to the top member; and
  - a lower member attached at a first end to the top member and the steering mechanism and at a second end to the transverse member
- a ski system attached to the frame and extending from the front end to the rear end of the frame; and
- a platform positioned between the top member and the ski system and extending from the front end to the rear end of the frame substantially parallel to the ski system, the platform including a platform front end and a platform rear end, the platform front end being attached to the transverse member and, at a first location, to the ski system and the platform rear end being attached to the ski system at a second location disposed rearwards of the first location.

16. A vehicle as set forth in claim 15, wherein the frame is collapsible to permit the frame to take on a compact configuration relative to its non-collapsed configuration.

17. A vehicle as set forth in claim 15, wherein the top member is pivotally attached to the lower member about the front end of the frame.

18. A vehicle as set forth in claim 15, wherein the transverse member is pivotally attached to the top member.

19. A as set forth in claim 15, wherein the transverse member is movably coupled to the lower member.

20. A vehicle as set forth in claim 15, wherein the frame further includes a bracing member connected to the lower member, so as to permit the frame to securely engage the platform.

21. A vehicle as set forth in claim 15, wherein the ski system includes one continuous ski extending from the front end to the rear end the frame.

22. A vehicle as set forth in claim 15, wherein the ski system includes
- a first ski attached to the steering mechanism and capable of being directed for maneuvering the vehicle; and,
- a second ski coupled to the transverse member, such that the second ski is in substantial linear alignment with the first ski.

23. A vehicle as set forth in claim 22, further including a front suspension system between the first ski and the steering mechanism to provide shock absorption and dampening to the first ski.

24. A vehicle as set forth in claim 22, further including a rear suspension system between the platform and the second ski to provide shock absorption and dampening to the second ski.

25. A vehicle as set forth in claim 22, wherein the first and second locations are disposed over the second ski.

26. A vehicle as set forth in claim 15, wherein the frame includes a handle coupled to the steering mechanism.

27. A vehicle as set forth in claim 15, wherein the platform includes a width sufficient to permit a user to stand thereon.

* * * * *